United States Patent
Watson et al.

(10) Patent No.: US 10,448,778 B2
(45) Date of Patent: Oct. 22, 2019

(54) BEVERAGE APPARATUS AND METHOD

(71) Applicant: Watsonbrew IP Limited, Hamilton (NZ)

(72) Inventors: Brian Wayne Watson, Hamilton (NZ); Richard George Cutfield, Hamilton (NZ); Mario Lanz, Hamilton (NZ)

(73) Assignee: Watsonbrew IP Limited, Hamilton (NZ)

( * ) Notice: Subject to any disclaimer, the term of this patent is extended or adjusted under 35 U.S.C. 154(b) by 329 days.

(21) Appl. No.: 14/392,320

(22) PCT Filed: Jun. 30, 2014

(86) PCT No.: PCT/NZ2014/000131
§ 371 (c)(1),
(2) Date: Dec. 24, 2015

(87) PCT Pub. No.: WO2014/209138
PCT Pub. Date: Dec. 31, 2014

(65) Prior Publication Data
US 2016/0201018 A1    Jul. 14, 2016

(30) Foreign Application Priority Data

Jun. 28, 2013 (NZ) .................................. 612658
Dec. 13, 2013 (NZ) .................................. 618943
Jun. 17, 2014 (NZ) .................................. 626351

(51) Int. Cl.
*C12C 13/10* (2006.01)
*C12C 11/00* (2006.01)
(Continued)

(52) U.S. Cl.
CPC ......... *A47J 27/21083* (2013.01); *A47J 27/08* (2013.01); *A47J 27/0802* (2013.01); *C12C 11/00* (2013.01); *C12C 13/10* (2013.01)

(58) Field of Classification Search
CPC .. A47J 27/21083; A47J 27/08; A47J 27/0802; C12C 11/00; C12C 13/10
See application file for complete search history.

(56) References Cited

U.S. PATENT DOCUMENTS 2,564,163 A * 8/1951 Leperre .................. B65D 77/06
                                                            141/114
3,981,803 A * 9/1976 Coulthard ................. C02F 3/28
                                                            210/178
(Continued)

FOREIGN PATENT DOCUMENTS

CA          2501570        9/2006
CN        201442937        4/2010
(Continued)

OTHER PUBLICATIONS

Australian Patent Office; International Search Report for PCT/NZ2014/000131, dated Sep. 24, 2014.
(Continued)

*Primary Examiner* — Anthony J Weier
(74) *Attorney, Agent, or Firm* — Moore & Van Allen PLLC; Henry B. Ward, III

(57) ABSTRACT

A beverage apparatus, system and methods for use are provided. The apparatus includes a pressure vessel configured to receive a flexible bag for containing a beverage. A pressure release valve is connected to the bag, and a pressure source connected to the pressure vessel. A temperature adjustment device is also provided to adjust temperature within the pressure vessel. A controller controls the temperature adjustment device and the pressure source to achieve a desired temperature and pressure within the pressure vessel according to a current mode of the apparatus, where the current mode is selected from a plurality of modes.

19 Claims, 9 Drawing Sheets

(51) Int. Cl.
*A47J 27/21* (2006.01)
*A47J 27/08* (2006.01)

(56) References Cited

U.S. PATENT DOCUMENTS

| | | | | |
|---|---|---|---|---|
| 4,098,434 | A | * | 7/1978 | Uhlig ................. B65D 83/0055 |
| | | | | 222/105 |
| 4,376,489 | A | * | 3/1983 | Clemens .............. B65D 88/128 |
| | | | | 137/264 |
| 4,708,938 | A | | 11/1987 | Hickinbotham |
| 4,902,521 | A | | 2/1990 | Rosenfeld |
| 5,040,704 | A | * | 8/1991 | Moran ................. B65D 83/625 |
| | | | | 222/386.5 |
| 5,169,037 | A | * | 12/1992 | Davies ................... B65D 83/62 |
| | | | | 222/386.5 |
| 5,251,787 | A | * | 10/1993 | Simson ................ B67D 1/0462 |
| | | | | 222/105 |
| 5,737,186 | A | * | 4/1998 | Fuesser ..................... F28F 3/12 |
| | | | | 165/80.4 |
| 7,682,823 | B1 | * | 3/2010 | Runyon ................. C12M 23/14 |
| | | | | 210/616 |
| 7,819,286 | B2 | * | 10/2010 | Antheil .............. B65D 21/0231 |
| | | | | 220/495.01 |
| 2002/0147426 | A1 | * | 10/2002 | Faries, Jr. ........... A61M 5/1483 |
| | | | | 604/140 |
| 2005/0284884 | A1 | | 12/2005 | Roy-Wedderburn |
| 2006/0138177 | A1 | | 6/2006 | Wauters et al. |
| 2006/0150637 | A1 | * | 7/2006 | Wauters ............... B67D 1/0462 |
| | | | | 62/3.64 |
| 2010/0129490 | A1 | | 5/2010 | Williams et al. |
| 2012/0156339 | A1 | | 6/2012 | Studor et al. |

FOREIGN PATENT DOCUMENTS

| | | |
|---|---|---|
| DE | 102006009612 A1 | 9/2007 |
| EP | 0071365 | 10/1986 |
| EP | 2493807 | 3/2014 |
| GB | 1273495 | 5/1972 |
| GB | 2146705 | 4/1985 |
| GB | 2288584 | 10/1995 |
| GB | 2483286 | 3/2012 |
| JP | 2004-344055 | 12/2004 |
| NZ | 211908 | 2/1988 |
| WO | WO 9950383 | 10/1999 |
| WO | WO 2004050537 | 6/2004 |
| WO | WO 2008020760 | 2/2008 |
| WO | WO 2011009154 | 1/2011 |

OTHER PUBLICATIONS

Australian Patent Office; International Preliminary Report on Patentability for PCT/NZ2014/000131, dated Dec. 17, 2014.

* cited by examiner

BEVERAGE APPARATUS AND METHOD

STATEMENT OF CORRESPONDING APPLICATIONS

This application is based on the specification filed in relation to New Zealand Patent Application Number 612658, the specification filed in relation to New Zealand Patent Application Number 618943, and the specification filed in relation to New Zealand Patent Application Number 626351, the entire contents of which are incorporated herein by reference.

TECHNICAL FIELD

The present invention relates to a beverage system—Particularly for brewing and/or conditioning and/or storing and/or dispensing beverages such as beer or cider.

BACKGROUND

Beverages, such as beer, brewed and/or draught dispensed at home have a number of qualities desired by consumers—for example, cost in comparison with commercially brewed and/or bottled product, freshness, natural carbonation, the ability to customise flavours, avoiding need for pasteurisation, and reducing waste produced by disposable containers.

Generally, home-brewing of beer adapts large-scale brewing techniques to less sophisticated equipment—requiring considerable manual effort and care with regard to sanitisation and preparation of equipment and ingredients, and the brewing and storage processes themselves.

While numerous devices have been developed in an attempt to simplify these processes and make them easier and more consistently manageable for the general public, there remains room for improvement.

The storage and dispensing of draught carbonated beverages in smaller quantities is also an area for development.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

SUMMARY

According to an exemplary embodiment there is provided a beverage apparatus, including:
  a pressure vessel configured to receive a flexible bag configured to contain a beverage;
  a temperature adjustment device configured to adjust temperature within the pressure vessel;
  a pressure release valve configured to be connected to the bag; and
  a controller configured to:
    control the temperature adjustment device according to a current mode of the apparatus.

According to an exemplary embodiment there is provided a beverage apparatus, including:
  a pressure vessel configured to receive a flexible bag configured to contain a beverage;
  a pressure source connected to the pressure vessel; and
  a controller configured to:
    control delivery of pressure from the pressure source in order to adjust pressure within the pressure vessel according to a current mode of the apparatus.

According to an exemplary embodiment there is provided a beverage apparatus, including:
  a pressure vessel configured to receive a flexible bag configured to contain a beverage;
  a pressure release valve configured to be connected to the bag;
  a pressure source connected to the pressure vessel;
  a temperature adjustment device configured to adjust temperature within the pressure vessel; and
  a controller configured to:
    control the temperature adjustment device, and delivery of pressure from the pressure source in order to adjust pressure within the pressure vessel, according to a current mode of the apparatus.

According to an exemplary embodiment there is provided a beverage apparatus, including:
  a pressure vessel configured to receive a flexible bag for containing a beverage;
  a pressure release valve configured to be connected to the bag;
  a pressure source connected to the pressure vessel;
  a temperature adjustment device configured to adjust temperature within the pressure vessel; and
  a controller configured to:
    control the temperature adjustment device to achieve a desired temperature within the pressure vessel according to a current mode of the apparatus, and
    control the pressure source to achieve a desired pressure within the pressure vessel according to the current mode,
    wherein the current mode is selected from a plurality of modes.

According to an exemplary embodiment there is provided a beverage system, including:
  a pressure vessel;
  a flexible bag containing a beverage, the bag positioned within the pressure vessel;
  a pressure release valve connected to the bag;
  a pressure source connected to the pressure vessel;
  a temperature adjustment device configured to adjust temperature within the pressure vessel; and
  a controller configured to:
    control the temperature adjustment device to achieve a desired temperature within the pressure vessel according to a current mode of the apparatus, and
    control the pressure source to achieve a desired pressure within the pressure vessel according to the current mode, wherein the current mode is selected from a plurality of modes.

Reference to a beverage may include a product intended for consumption, or one or more ingredients required to prepare the product within the bag.

The beverage may be supplied as:
a brewed product within the bag, to be dispensed using an embodiment of beverage apparatus;
as a base ingredient such as unfermented wort or fruit juice concentrate within the bag—whether concentrated or diluted—to be fermented (or "brewed") by adding a fermentation agent such as yeast and processing the mixed ingredients using an embodiment of the beverage apparatus;
the bag may be supplied empty, with the customer or intermediary supplier filling the bag with either the beverage ingredients or the finished beverage as desired.

Embodiments are envisaged as being particularly suited to the brewing and dispensing of beer. However, it should be appreciated that this is not intended to be limiting, and the invention may be used in relation to other beverages.

Reference to a pressure vessel should be understood to mean any vessel capable of being sealed and pressurised to a desired level. Such vessels are well known in a range of applications, and any number of configurations may be suitable for use with the present invention.

Embodiments may include a pressure release valve connected to the interior of the bag. The pressure release valve may be configured to maintain a desired pressure level within the bag. For example, during the fermentation of a beverage it may be desirable to maintain a pressure level of substantially 20 to substantially 30 PSI within the bag in order to assist in achieving carbonation of the beverage through reabsorption of $CO_2$ released by fermentation. It should be appreciated that this is not intended to be limiting, and the pressure level may depend on the beverage or desired condition of same.

Embodiments may include a temperature adjustment device configured to adjust temperature within the pressure vessel. The temperature adjustment device may use any suitable means known in the art to raise or lower the internal temperature of the pressure vessel. For example, the temperature adjustment device may include a heating unit and a refrigeration unit, or a single device such as a Peltier element. The internal temperature of the pressure vessel may be determined using any suitable means known in the art.

It should be appreciated that reference to achieving a desired temperature or pressure level may include the subsequent control of the respective devices to maintain the desired characteristic.

In embodiments, the medium by which pressure is applied to the exterior of the bag is gaseous. Embodiments may include a pressure source configured to be controlled to adjust pressure within the pressure vessel. Adjustment of pressure may be accomplished by an intermediary pressure control mechanism such as a valve between the pressure vessel and pressure source—such as a pressurised reservoir of $CO_2$ or another gas. In another embodiment, control may be related to operation of the source of pressure itself—such as an air pump or compressor.

It is envisaged that pressure sources capable of pressurising the pressure vessel using gas rather than liquid may have advantages such as reducing the likelihood of leaks causing damage to components of the apparatus itself or the surrounding environment; reducing the risk of cross contamination of the beverage in the bag by liquid in the pressure vessel in the event of permeation through, or breach in, the bag; or greater flexibility of location in comparison with needing to connect the apparatus to a pressurised liquid source.

Generally, reference to a mode should be understood to mean a particular method of operating the apparatus, intended to achieve a distinct result. In the context of a beverage, such methods may be specific to a stage of the beverage's preparation cycle—as will be described further below. It is envisaged that the controller may be configured to operate in accordance with a plurality of modes, each having distinct control parameters with regard to at least one of: temperature, pressure within the vessel, and time. It follows that the current mode is that currently required in order to achieve a distinct result in relation to the beverage.

It is envisaged that by controlling operation of the apparatus in accordance with the modes, greater consistency in the resulting characteristics of the beverage may be achieved—particularly with automation of transitions between different modes.

Determination of the current mode of the apparatus may include the controller receiving an indication of a selection of the current mode of the apparatus.

In embodiments a user interface for control of the apparatus may be provided. The user interface may take any number of forms—for example physical buttons, or softkeys on a touch pad. The user interface may be provided at the apparatus, or remotely—whether a dedicated remote control, or an application operating on a device such as a smart phone. A display may be included to assist navigation, and/or display the current mode of the apparatus—again, at the machine or at the remote controlling device.

In exemplary embodiments, an indication may be a signal generated on selection of a mode by a user via the user interface. It should be appreciated that this is not intended to be limiting—for example the controller may transition to another mode on certain conditions within an automated routine being reached—for example a predetermined time lapsing within a certain mode.

A staged process control or process status memory may be provided to ensure that the apparatus resumes its process following any interruption to the power source of the apparatus or similar instances of interruption.

It should be appreciated that pressure, time, and/or temperature settings within modes may depend on the beverage. Selection of the beverage or beverage type may, for example, be performed by the user of the apparatus through the user interface.

For example, in the context of preparing a fermented beverage such as beer, the modes of the apparatus may include a fermenting mode. In this mode, the temperature adjustment device may be controlled to adjust the temperature within the pressure vessel to be within a first temperature range suitable for fermentation of the beverage, for a first predetermined period of time. In the context of beer this first temperature may be within the range of substantially 15 to substantially 25 degrees Celsius (° C.)—although it should be appreciated that these values may be determined as appropriate to the particular beverage style and/or fermentation agent used. This temperature may be maintained for a predetermined period of time—for example substantially 120 hours, again dependent on the particular beverage. During this time, beer is produced by the yeast converting the fermentable sugars in the wort to alcohol and $CO_2$.

In exemplary embodiments, control of the pressure within the pressure vessel may include venting the vessel to atmosphere, or at least not active control by the controller.

Once the predetermined time associated with the fermenting mode is complete, a conditioning mode may be entered. In this mode, the temperature adjustment device may be controlled to adjust the temperature within the pressure vessel to be within a second temperature range below the first temperature range, suitable for conditioning of the beverage, for a second predetermined period of time.

In the exemplary context of beer, the temperature may be reduced to substantially 2° C. or below. This temperature may be maintained for a period of time, for example at least substantially 70 hours, during which time the specified temperature causes the fermentation activity to cease and the inactive fermentation agent to settle to the bottom of the bag in order to improve the taste and clarity of the beer.

The conditioning mode may include controlling the pressure source to achieve a desired conditioning pressure level within the pressure vessel.

Cooling of the beverage may result in a drop in internal pressure within the bag. If left uncontrolled this may have an undesirable effect on carbonation of the beverage. Where it is desirable for the beverage to have a relatively low level of carbonation, such as with beer, a small variation from this level may have a significant effect with regard to desirable characteristics such as the head and mouth feel of the beer.

In accordance with Henry's law, the solubility of a gas increases in direct proportion to pressure:

$$p(CO_2)=k_H \cdot c(CO_2),$$

where $p(CO_2)$ is the partial pressure of $CO_2$ in the gaseous phase, $c(CO_2)$ is the concentration of the $CO_2$ in the liquid phase, and $k_H$ is a constant dependent on on the solute, the solvent and the temperature.

Given the above, there may be prescribed pressures and temperatures and combinations of same to assist in achieving and maintaining desired levels of carbonation within a contained vessel (i.e. the bag). For example, a desirable range for $CO_2$ saturation in beer may be substantially 4.7 to substantially 5.1 grams per liter—maintenance of which may require storage pressure of the beer in the bag stored at substantially 2° C. to be maintained at a pressure of substantially 10 to substantially 12 PSI.

By controlling and maintaining external pressure on the bag, the headspace within the bag may be reduced to compensate for the previous decrease in internal pressure due to temperature. Reducing the headspace in turn enables a desired internal pressure to be achieved—thereby maintaining the desired conditions for carbonation. It follows that the desired conditioning pressure level within the vessel may be determined based, at least in part, on temperature within the pressure vessel (and therefore of the beverage) in order to achieve this.

In embodiments, pressure levels within the pressure vessel may adjusted to be substantially proportional to temperature, although it should be appreciated that the ability to achieve an exact proportional relationship may be influenced by the accuracy of the measuring instruments and control of the pressure source. Further, in embodiments such adjustments in pressure may be stepwise or continuous.

In an exemplary embodiment, pressure adjustment may be applied after a predetermined temperature is achieved. More particularly, control of the pressure source to achieve the desired conditioning pressure level may be initiated on determining that the temperature within the pressure vessel has decreased from being within the first temperature range to a predetermined temperature.

For example, the pressure source may not be activated to achieve the desired pressure within the vessel until the temperature reaches a point below which internal pressure may have reduced below that required to maintain the desired degree of carbonation. In an exemplary embodiment this temperature may be substantially 4 to substantially 9° C.—but it is reiterated that this value may change depending on the type of beverage, style of beverage, or a desired characteristic for the beverage. This may reduce demands on the pressure source—in the case of a pressurised canister this may enable longer use before requiring recharging or replacement, while in the case of an air pump or air compressor the service life may be increased.

Once the conditioning process has completed, or on placement of a bag ready to be dispensed into the apparatus, a storage and/or dispense mode may be entered into.

In such modes the temperature may be controlled to a desired temperature or temperatures for storage and presentation of the beverage. For example, in the case of beer the dispensing temperature may be within substantially 2 to substantially 4° C.

The external pressure on the bag means that when a dispensing outlet—such as a tap connected by a conduit to the bag—is opened, the beverage may be squeezed from the bag and through the conduit due to the resulting pressure differential. With many beverages, it may be desirable to avoid turbulent flow of the beverage during dispensing—both for preserving the consistency of the beverage, and to avoid disturbance of residual ingredients which may have settled in the base of the bag. With pressure acting equally on all exposed external surfaces of the bag within the pressure vessel, the dispensing action created may assist in achieving this.

It is envisaged that this may be assisted through the use of gas to pressurise the pressure vessel as opposed to a liquid. Were liquid to be used, pressurising the pressure vessel would be more likely to result in lifting the base of the bag, effectively floating it within the vessel. This lifting from the base could disturb any sediment and hence reduce the clarity of the beverage when dispensed. The use of gas means that the weight of the beverage in the bag may lead to squeezing of the bag from its sides under pressure, thereby reducing movement at the base. Further, this squeezing from the sides may result in the bag collapsing about sediment at the bottom towards the end of dispensing—decreasing the likelihood of this sediment becoming mixed in the remaining beverage and therefore improving yield.

During storage and dispensing, maintaining the external pressure on the bag may also assist in maintaining carbonation as discussed above and preserving the beverage, closing the system and avoiding de-carbonation or introduction into the bag by closing of the dispensing outlet.

As such, in embodiments the controller may be configured to control the temperature adjustment device to adjust the temperature within the pressure vessel to be within a third temperature range suitable for dispensing of the beverage, and control the pressure source to maintain a dispensing pressure level within the pressure vessel.

In embodiments where the beverage is previously prepared, and does not require a fermentation or conditioning process, a chilling or storage mode may be provided for, in which the dispensing temperature is maintained for a predetermined period of time before entering into dispense mode.

Further, it should be appreciated that two or more of the stages described may be combined into a single process or mode. For example, the fermenting and conditioning modes may be combined into a brewing mode, or conditioning, chilling and dispense modes may be combined into a storage mode.

The pressure vessel may include a lid on top of its body for ease of access and positioning of the bag—but this is not intended to be limiting, as access to the interior of the vessel may be achieved in other ways.

In embodiments, the lid may be secured to the body or chamber such that, where the bag is attached to the lid, the lid does not require rotation which might otherwise result in significant twisting of the bag material—potentially compromising the ability of the bag to fill out, and be supported by, the pressure chamber and underside of the lid. It is envisaged that this may be achieved, for example, using a bayonet connection which does not require rotation beyond substantially 60°. It should be appreciated that alternative means of connection may be used, such as trim rings or clasps.

In an exemplary embodiment, the underside of the lid, facing the pressure vessel in use, may be concave. It is envisaged that the curve of the lid may assist with directing expansion of the bag as it is filed and/or internal pressure increases. In doing so, the likelihood of folds or creases being formed at the end of the bag proximate to the lid may be reduced—which could otherwise trap carbon dioxide ($CO_2$) below the "waterline" of the beverage, and also potentially disrupt even flow when dispensing the beverage.

In an exemplary embodiment, the lid may include a ridge configured to extend into the pressure vessel in use. The ridge may be configured to permit an air gap between the ridge and the walls of the pressure vessel.

The pressure vessel may include a pressure port permitting connection of the interior of the pressure vessel to the pressure source. This pressure port may be positioned such that, when the lid is fitted to the pressure vessel, the ridge is positioned between the pressure port and the interior of the pressure vessel.

It is envisaged that this may reduce the likelihood of the bag blocking the pressure port—whether by being caught in the lid or otherwise—and affecting operation of the apparatus.

According to an exemplary embodiment there is provided a pressure vessel for a beverage apparatus, including:
  a pressure chamber including a pressure port in at least one wall; and
  a lid configured to be fitted to the pressure chamber, the lid including a ridge extending below the port when fitted to the pressure chamber.

At least one fitment configured to connect the bag via fluid pathways to the pressure release valve and/or dispensing outlet, such as a tap, may be provided. In order to assist with maintaining hygiene of the system, the fitment(s) may be intended for disposal after the brewed beverage has been dispensed—although it should be appreciated that this is not intended to be limiting.

The at least one fitment may be configured to connect to an upper portion bag of the bag in use. In embodiments, the bag may include a dispensing outlet to which the fitment may be connected, positioned within the upper 10 percent of the bag in use—more particularly at the apex of the bag in use. It is envisaged that this may assist on keeping any residual ingredients settled at the base of the bag in use—with turbulent flow occurring at the point of exit to the fitment.

In an embodiment the fitment may include a non-return valve, configured to enable introduction of additives into the bag. In an exemplary embodiment this may be achieved by seating a seal against an aperture, with pressure from additives introduced through the passage unseating the seal temporarily. In another exemplary embodiment, a self-sealing valve such as those used in inflatable bladders, or a septum having elastomeric properties may be provided—through which a needle or other delivery mechanism may be inserted to deliver additives into the bag. It should be appreciated that the non-return valve may be integrated into the bag separately, rather than included in the fitment.

In some embodiments the pressure release valve and/or dispensing tap may be part of the fitment, for disposal after a single use. The dispensing tap may incorporate the pressure release valve, providing a single component to perform both functions. However, it should be appreciated that this is not intended to be limiting, as one or more of these components may be permanent fixtures of the apparatus.

Similarly, the dispensing tap may be a pinch valve configured to receive a tube leading from the bag. In this configuration, the tap may be a permanent fixture, with the tube disposable to provide a simple means of maintaining hygiene without requiring cleaning.

In embodiments in which the pressure release valve (and/or pressure gauge) is a reusable fixture of the apparatus, it is envisaged that a controllable sealing valve (for example, a solenoid or pinch valve) may be positioned between the pressure release valve and the point of connection to the bag. Once the brewing and/or conditioning process has been completed, and dispensing is to occur, the sealing valve may be closed to prevent the beverage from entering the release valve. This may assist in maintaining hygiene of the system, without requiring cleaning or servicing of the release valve.

In an exemplary embodiment, the fluid pathway between the bag and the pressure release valve may include a liquid resistant device. It is envisaged that this liquid resistant device may permit the passage of gas—for example for the purpose of pressure release—but prevent or at least restrict the passage of liquid. This device may be a valve such as a ball valve which closes as liquid levels rise.

In an exemplary embodiment, the liquid resistant device may be a gas permeable and at least liquid resistant, if not hydrophobic, membrane. For example, the device may be made of a waterproof-breathable fabric made of porous polymers—such as the porous form of polytetrafluoroethylene marketed at the time of filing this application as Gore-Tex® or the sintered porous polyethylene or polypropylene marketed at the time of filing this application as Vyon®.

In an exemplary embodiment, the liquid resistant device may include a hygroscopic barrier which permits the passage of gas through or around it, but expands in the presence of liquid to block the fluid pathway between the bag and the pressure release valve.

In another embodiment the beverage may be restricted from entering the release valve by creation of a pressure lock—for example by locating the point of connection of the pressure release valve to the bag at a point above the connection point of the dispensing outlet to the bag, separated by sufficient head space (or internal volume) to maintain sufficient pressure in the connection to the pressure release valve to avoid the beverage migrating to the pressure release valve. In an embodiment this pressure lock may be augmented by the connection between the bag and pressure release valve being at least partially formed from material with a relatively low level of gas permeability so as to reduce the degree of any pressure loss in the connection over time.

In an embodiment, the pressure lock may be accomplished by providing a pressure release port above a dispensing port in the aforementioned fitment. At least one gas and/or liquid collection reservoir may be positioned between the pressure release valve and the point of connection to the bag to assist with this.

In an embodiment, a one way valve may be provided in the fluid pathway to the pressure release valve. It is envisaged that this may prevent loss of pressure in the fluid pathway when opening the dispensing tap, leading to a pressure differential drawing liquid into this fluid pathway.

The apparatus may include a filtration unit between the bag and the dispensing tap. The filtration unit may use any technique known in the art for the filtration of beverages prior to dispensing.

A flavour unit may be positioned in the dispensing line between the bag and the tap. For example, the flavour unit may include a chamber within which a fluid permeable container containing the flavouring material. In a more particular embodiment, it is envisaged that the permeable container may take the form of a "tea-bag" containing hops.

In embodiments, it is envisaged that the filtration unit and flavour unit may be integrated into a single unit—reducing the number of parts within the apparatus to be cleaned, which may be particularly useful in the context of fermented beverages.

Reference to a bag should be understood to mean a container having flexible sides configured to expand and contract under changing internal and external pressures. The bag may be made of any suitable material known in the art for containing consumable material. For example, the bag may be made of a foil laminate for its oxygen barrier properties—although it should be appreciated that this is not intended to be limiting.

In an embodiment, the internal capacity of the bag may be greater than the internal volume of the pressure vessel. In an exemplary embodiment the volume capacity of the bag may be at least substantially 25% greater than the internal volume of the pressure vessel. In doing so, it is envisaged that the interior of the pressure vessel may assist in supporting the structural integrity of the bag as it fills out to press against the vessel—particularly during exemplary embodiments which the bag may experience internal pressures of substantially 40 PSI during fermentation depending on the beverage—even where there are some variances in the bag and pressure vessel dimensions. It is envisaged that where the temperature adjustment device is position against a wall of the pressure vessel, oversizing of the bag may also assist in increasing the efficiency of heat transfer between the temperature adjustment device and beverage—particularly at the base where the weight of the beverage would eliminate air gaps between the beverage and base of the vessel.

In an exemplary embodiment, the bag may be configured such that, in use, an upper portion of the bag is substantially the same shape as the interior of the pressure vessel. For example, the upper edge of the bag may be a convex curve. Where the pressure vessel is cylindrical, shaping in the bag in this way may assist in preventing the bag from becoming caught between the vessel chamber and lid during fitting of the lid to the chamber. This may also assist in reducing the likelihood of a discontinuous internal surface at the top which may entrap gas and/or disrupt fluid flow.

In an exemplary embodiment, the bag may be configured to have a discontinuous internal surface at its base in use. For example, the bag may be sized and/or shaped to create excess material at its base when fitted into the pressure vessel in order to crease and fold to assist in trapping and retaining undissolved ingredients—such as spent yeast sediment—at the base of the bag to improve clarity of beverage dispensed via the top of the bag.

The bag may include a spout made of more rigid material than the walls of the bag. The spout may be attached to the bag by any suitable means known in the art. In use, it is envisaged that the spout may be configured to extend through the lid of the pressure vessel. The spout may be configured to interface with the fitment described above.

In an exemplary embodiment, the spout may be configured to be attached to the lid such that the flexible walls of the bag lie against the surface of the lid facing the pressure vessel. This may assist with reducing strain on the point of connection between the spout and the walls of the bag under pressure.

The connection of the spout into the lid may be achieved using any suitable means known in the art. For example, this may be achieved using bayonet or push fittings, or trim-ring connections, between the bag spout and the pressure vessel lid.

The interface between the spout and the lid may include a seal—for example via a flange on the spout which bears against the lid. A gasket seated against the flange may assist with the sealing effect.

In an embodiment the flexible bag may include a main compartment configured to contain base ingredients for the beverage, and a secondary compartment containing a fermentation agent.

In an embodiment the base ingredient is beer wort or concentrated beer wort, and the fermentation agent is yeast. It should be appreciated that this is not intended to be limiting, and while embodiments of the present invention are envisaged as being particularly suited to the brewing of beer, it may be used in relation to other beverages.

According to another aspect of the present invention there is provided a flexible brewing bag, including:
  a main compartment configured to contain base ingredients for a beverage; and
  a secondary compartment containing a fermentation agent, the secondary chamber configured to be sealed from the main chamber until actively opened.

In embodiments the secondary compartment may be a fitment configured to be attached to the bag. It is envisaged that this may be useful for mixing and matching ranges of wort and yeasts to achieve a user's desired beer style without risk of the user introducing incorrect dosage or other contaminants (i.e. achieving aseptic mixing). However, it should be appreciated that this is not intended to be limiting, and the secondary compartment may be manufactured as part of the bag.

According to another aspect of the present invention there is provided a method of brewing a beverage using the beverage apparatus substantially as described above, the method including the steps of:
  positioning a flexible bag within the pressure vessel;
  connecting the bag to the pressure release valve;
  mixing the base ingredients and fermentation agent; and
  controlling the temperature within the pressure vessel according to a fermenting mode of the apparatus.

Mixing the base ingredients and fermentation agent may include breaking the seal between the main and secondary compartments where the bag is of this configuration.

In some embodiments, water may be added to the bag at the beginning of the brewing process. It is envisaged that in some embodiments the apparatus may be connected to a water supply, and the addition of water controlled by the apparatus. In others, the water may be added manually or with the aid of a separately supplied and calibrated filling vessel. Such a vessel may have a connection point configured to fit to the point of entry to the bag, and may include one or more of: a filter, volumetric measurement indicator, and a temperature measurement device to assist the user in filling the bag with the correct amount of liquid, at the correct temperature, screened of contaminants and without contamination.

It should be appreciated that other components may be added to the bag at desired times—for example clarification agents, flavouring or aromatic compounds during the conditioning mode, or additional flavourings that may be added prior to brewing. Such additives may be introduced, for example, via the aforementioned one way or self-sealing valve in the fitment.

According to another aspect of the present invention there is provided a method of conditioning a beverage using the beverage apparatus substantially as described above, the method including the steps of:

controlling the pressure and temperature within the pressure vessel and external to the bag according to a conditioning mode of the apparatus.

According to another aspect of the present invention there is provided a method of dispensing a beverage using the beverage apparatus substantially as described above, the method including the steps of:

controlling the pressure within the pressure vessel and external to the bag according to a dispensing mode of the apparatus; and opening a dispensing outlet to create a pressure differential between the exterior and interior of the bag and displace the beverage through the dispensing outlet.

In exemplary embodiments, the volume of beverage remaining in the bag may be determined, and an indication of same output to the user.

For example, the apparatus may include a weight measuring device, such as a load cell. In certain modes involving dispensing, changes in weight of the apparatus may be inferred as being due to the dispensing of beverage and the corresponding volume remaining calculated. The weight measuring device may be positioned at any position within the apparatus such that changes weight of the beverage contained within the bag may be inferred. For example, the weight measuring device may be positioned in the base, or a load bearing leg, of the apparatus.

Were the pressurising fluid to be a liquid such as water, the accuracy of such a determination of volume would be compromised, if not infeasible, due to the equalisation of weight as additional water was introduced to the pressure vessel to maintain pressure.

As a further example, the pressure change within the vessel may be monitored—with rapid changes in pressure being indicative of beverage being dispensed. The time required to re-pressurise the vessel may be indicative of the length of time of dispensing. This time, together with a flow rate based on the physical characteristics of the fluid pathway through the dispensing outlet, may be used to determine volume of beverage dispensed (and therefore volume remaining).

Once dispensing of the beverage is complete, or at any other stage where it is desirable to remove the bag, the pressure vessel may be de-pressurised to enable removal of the pressure vessel lid and the bag.

For a firmware and/or software (also known as a computer program) implementation, the techniques of the present invention may be implemented as instructions (for example, procedures, functions, and so on) that perform the functions described. It should be appreciated that the present invention is not described with reference to any particular programming languages, and that a variety of programming languages could be used to implement the present invention. The firmware and/or software codes may be stored in a memory, or embodied in any other processor readable medium, and executed by a processor or processors. The memory may be implemented within the processor or external to the processor.

A general purpose processor may be a microprocessor, but in the alternative, the processor may be any processor, controller, microcontroller, or state machine. A processor may also be implemented as a combination of computing devices, for example, a combination of a digital signal processor (DSP) and a microprocessor, a plurality of microprocessors, one or more microprocessors in conjunction with a DSP core, or any other such configuration. The processors may function in conjunction with servers and network connections as known in the art.

The controller may also be controllable from, and transmit information to, an external device such as a smart phone via any suitable means for wireless communication known to a person skilled in the art.

The steps of a method, process, or algorithm described in connection with the present invention may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

BRIEF DESCRIPTION OF DRAWINGS

Further aspects of the present invention will become apparent from the following description which is given by way of example only and with reference to the accompanying drawing in which.

DETAILED DESCRIPTION

Figure 1:
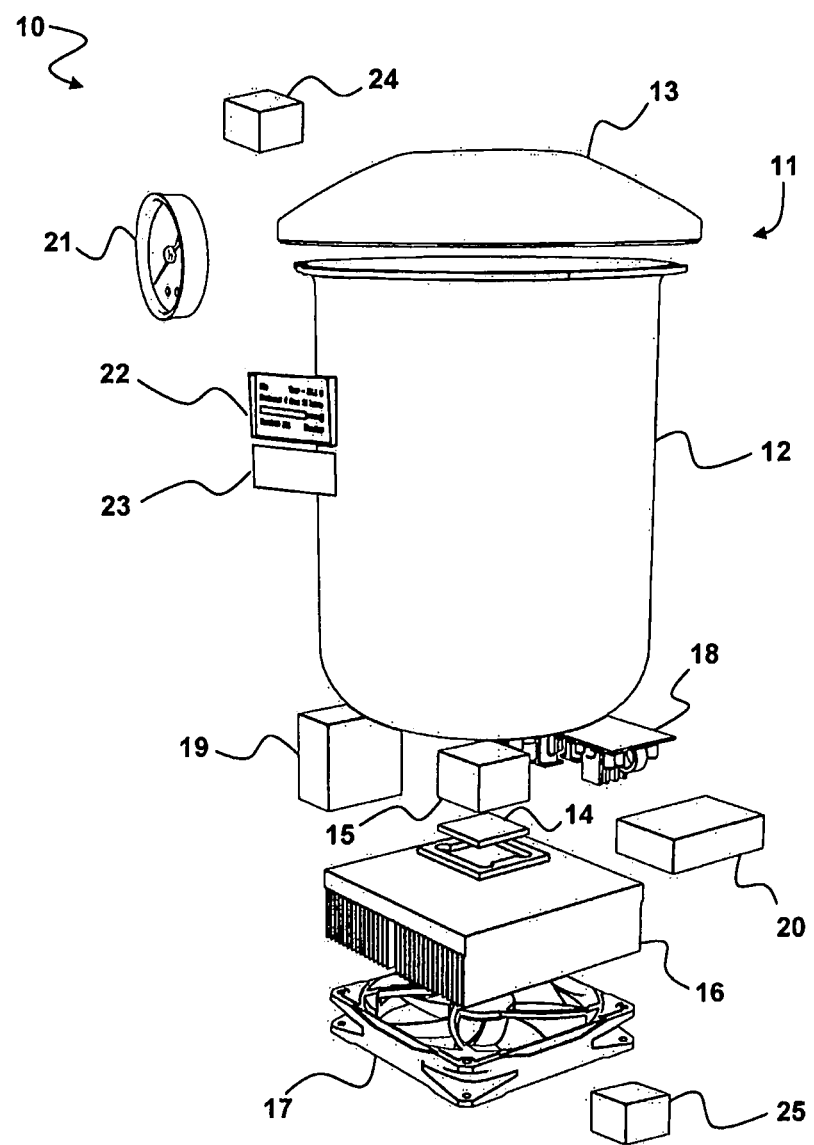
FIG. 1 is a perspective exploded view of an exemplary beverage apparatus.

FIG. 1 illustrates a beverage apparatus (generally indicated by arrow 10)—illustrated without a housing. The apparatus 10 includes a pressure vessel 11 having a pressure chamber 12 and a lid 13. The pressure vessel 11 is configured to receive a flexible bag, as will be described further below.

A temperature adjustment device is provided in the form of a peltier element 14, cooling block 15, heat sink 16, and cooling fan 17. Power is provided by power supply 18, and the temperature adjustment device is controlled by controller 19 to achieve a desired temperature within the pressure vessel 11. It should be appreciated that a temperature sensor outputting an indication of temperature may be integrated into the temperature adjustment device, or provided separately.

A pressure source 20 includes an air pump and pressure sensor, controlled by controller 19 to achieve a desired pressure within the pressure vessel 11. While the pressure sensor is illustrated as an integral component of the pressure source, it should be appreciated that this may be positioned at any desirable position within the apparatus 10. A pressure release valve and gauge 21 is configured to be connected to the interior of the bag within the pressure vessel 11, as will be illustrated in an exemplary embodiment described below.

A display unit 22 displays information relating to operation of the apparatus to the user, with user input unit 23 enabling the user to input commands to controller 19. The controller 19 may also communicate wirelessly with a remote user device, for example a smartphone (not illustrated), to display such information and receive user inputs.

Figure 2A:
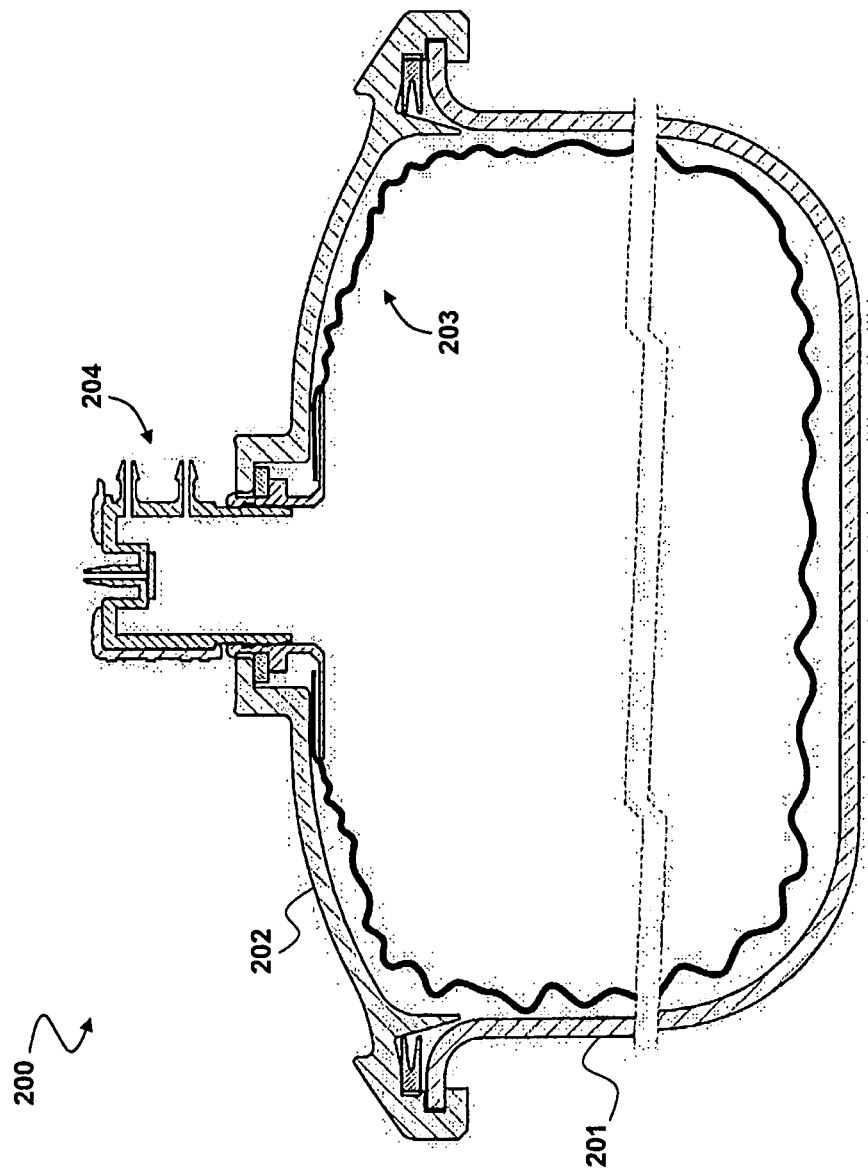
FIG. 2A is cross-sectional view of an exemplary pressure vessel.

FIG. 2A illustrates a pressure vessel 200, which may be used as pressure vessel 11 in FIG. 1. The pressure vessel 200 includes a pressure chamber 201 and lid 202, configured to contain a flexible bag 203, to which a fitment 204 is attached.

Figure 2B:
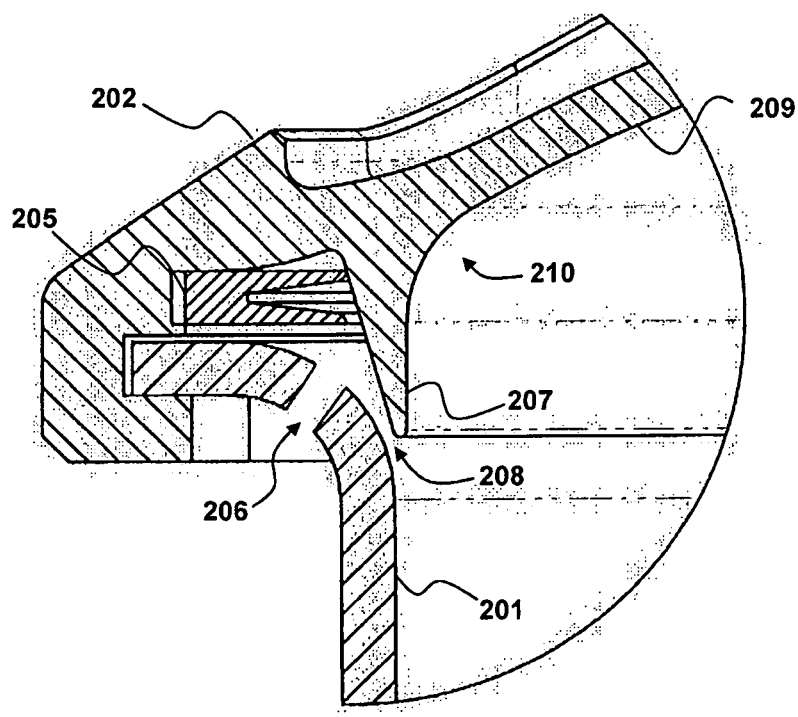
FIG. 2B is a cross-sectional view of the interface between an exemplary lid and chamber of the pressure vessel.

The interface between the pressure chamber 201 and lid 202 is illustrated in greater detail in FIG. 2B. A seal 205 around the periphery of the lid 202 seals against the wall of chamber 201. A pressure port 206 between the interior and exterior of the chamber 201 permits fluid communication with the pressure source (for example pressure source 20 of FIG. 1).

A ridge 207 on the underside of the lid 202 extends into the chamber 201, to a point below the port 206—leaving an air gap 208 between the chamber 201 and 202 via which the pressure in the chamber 201 may be adjusted.

The underside 209 of lid 202 is convex, with a curved transition 210 to the ridge 207. The curve assists in shaping the bag (bag 203 of FIG. 2A) as it expands against the lid 202 due to internal pressure. The ridge 207 assists in preventing the pressure port 206 from becoming blocked by the bag—particularly when securing the lid 202 to the chamber 201.

Figure 2C:
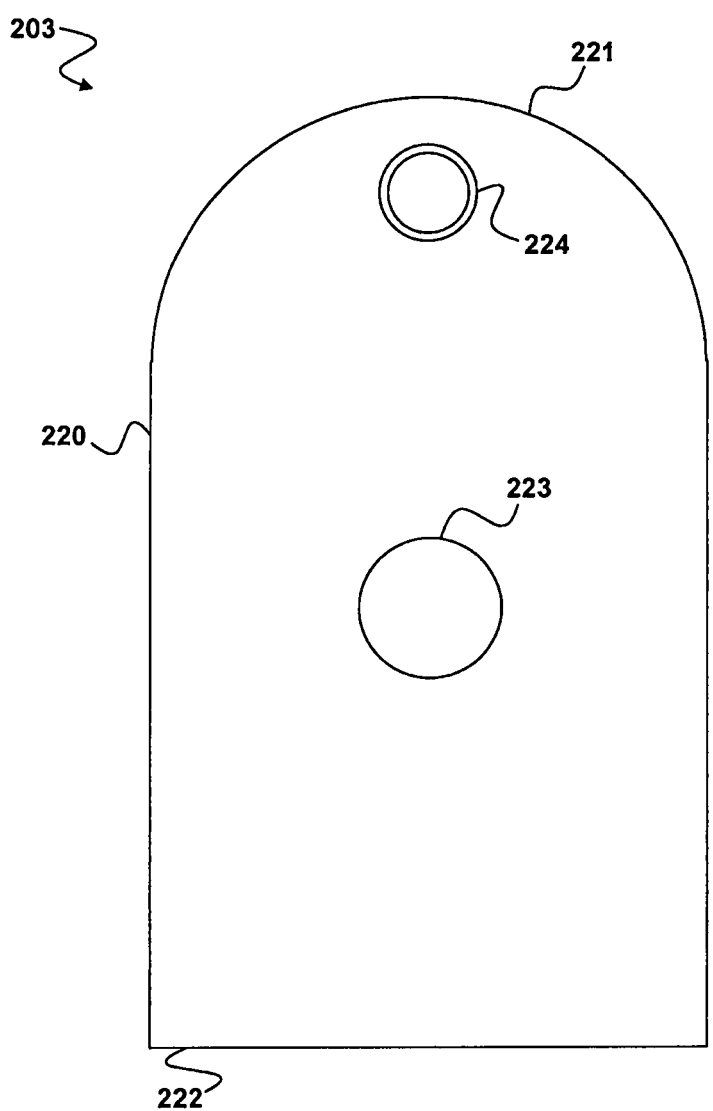
FIG. 2C is an exemplary flexible bag.

FIG. 2C illustrates the bag 203, including a main compartment 220 made of a foil laminate. The top edge 221 of the bag 203 is convex. When expanded, this encourages the bag 203 to expand evenly against the lid 202 and chamber 201. In contrast, the bottom 222 of the bag 203 is square, leading to creases and folds forming in the base to entrap residual un-dissolved ingredients and reduce the likelihood of them being dispensed.

The bag 203 may be sold with the main compartment 220 containing base ingredients (for example wort—whether concentrated or diluted) for a beverage, and a secondary compartment in the form of an additive fitment 223 containing a fermentation agent such as yeast. In another embodiment, the bag 203 may include only the main compartment 220, containing a beverage ready for consumption, or to be filled with ingredients or a finished beverage by the user, or containing some of the ingredients with the remaining ingredients and fermentation agent to be added by the user.

A rigid spout 224 is provided towards the top of the bag 203, providing a port to the interior of the main compartment 220.

Figure 2D:
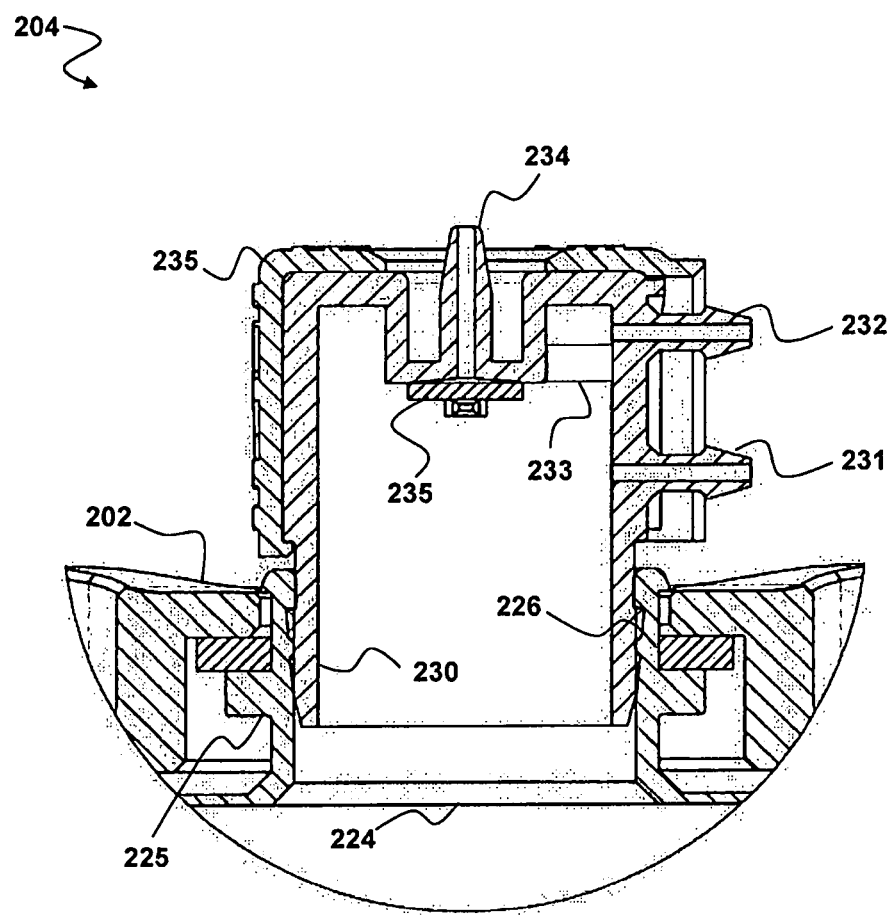
FIG. 2D is a cross-sectional view of the interface between the bag and lid.

FIG. 2D illustrates the ridged spout 224 attaching to the lid 202 via a bayonet catch arrangement. The spout 224 includes a flange 225, against which a gasket 226 is seated and seals the interface between the spout 224 and lid 202.

A fitment 230 clips into the spout 224. The fitment 230 includes a dispensing port 231, to which a tube (not illustrated) may be connected to provide a conduit to a dispensing tap (for example dispensing tap 300 of FIG. 3—discussed further below). A bag pressure port 232 is disposed above the dispensing port 231, to which a tube (not illustrated) may be connected to provide a fluid pathway to a pressure release valve (for example pressure release valve and gauge 21 of FIG. 1). A gas-permeable but liquid resistant barrier 233 may be positioned between the bag pressure port 232 and remainder of the fitment to reduce the likelihood of liquid entering the tube to the pressure release valve 21.

An additive port 234 in the top of the fitment 230 permits the introduction of additives into the main compartment 220 of the bag 203 shown in FIG. 2C. A one way valve is formed by seal 235, the edges of which may lift in response to pressure in the additive port 233 from additives injected therein. In other embodiments, a septum or self-sealing valve may be provided in place of the additive port 233 and seal 234.

It is envisaged that the bag 203 (containing ingredients), fitment 230, and tubing may be sold as a kitset. Once the kitset has been used to produce and/or dispense the beverage, it may be disposed of. It is envisaged that this may be particularly useful for avoiding the need to sanitise the equipment between uses—particularly where the beverage is a fermented beverage such as beer.

A fitment cap 235 may be fastened to the fitment 230 for aesthetic purposes, and to protect the ports 231 and 232.

Figure 3:
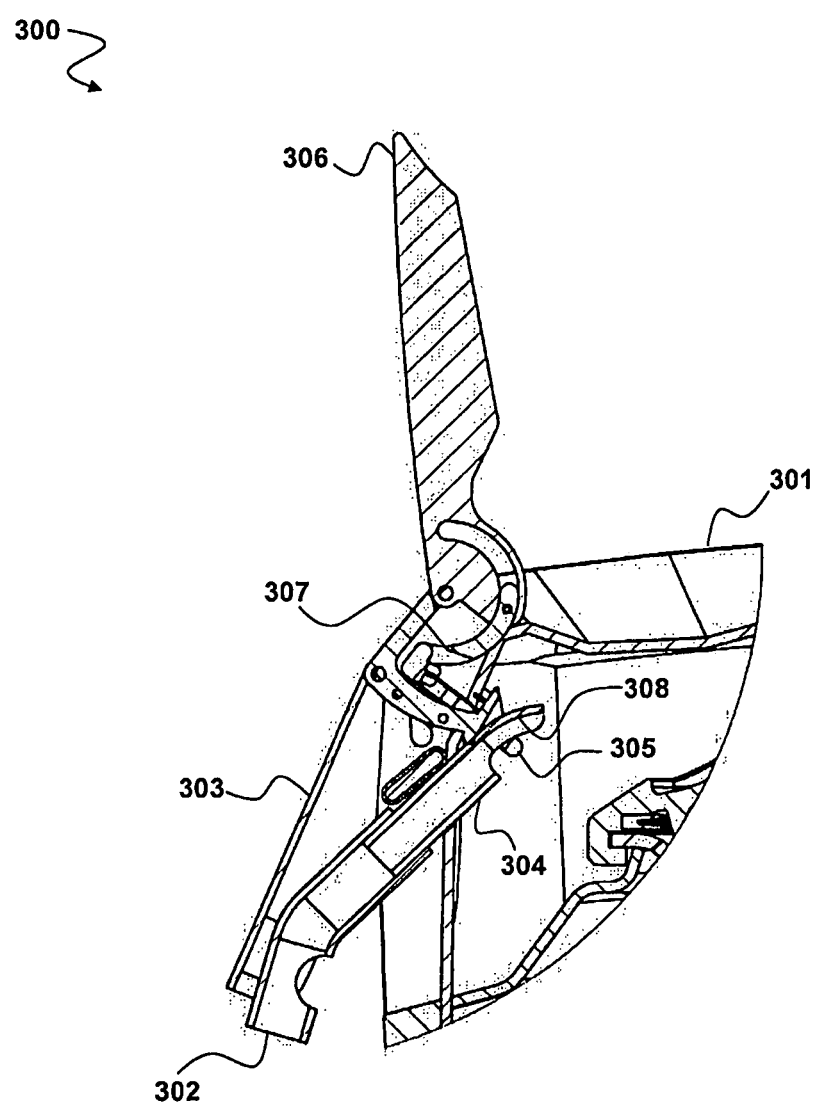
FIG. 3 is a cross-sectional view of an exemplary dispensing tap.

FIG. 3 illustrates a dispensing tap 300. The tap 300 is mounted in a housing 301—which may be used to contain the components in FIG. 1. The tap 300 includes a downspout 302 and downspout cover 303, which may be rotated out from the housing 301 when dispensing is desired. It should be appreciated that this is not intended to be limiting, and that in embodiments the positioning of the downspout 302 may be fixed relative to the housing 301.

A flexible tube (not illustrated) may be connected to a stem 304 of the downspout 302, passing through a pinch member 305. The pinch member 305 is connected to a handle 306 via an actuator link 307. When the handle 306 is in a stored position against the housing, or in the open position illustrated, the pinch member 305 is drawn towards a back wall 308 of the stem 304 to pinch and seal the flexible tube.

When the handle 306 is drawn forward from the position illustrated, the pinch member 305 is pushed forward by the link 307 to open the tube to permit fluid flow. It is envisaged that in exemplary embodiments the inner diameter of the tubing may be substantially 4 mm or less, and may vary in inner diameter at points along its length. It is envisaged that this may assist in dropping the dispensing pressure when the tap 300 is opened, reducing turbulence in the fluid flow and therefore reducing foam production.

The controller 19 may be configured to implement a number of methods, which will be described with reference to FIG. 1 to FIG. 3. It should be appreciated that the precise values provided are exemplary.

Figure 4:
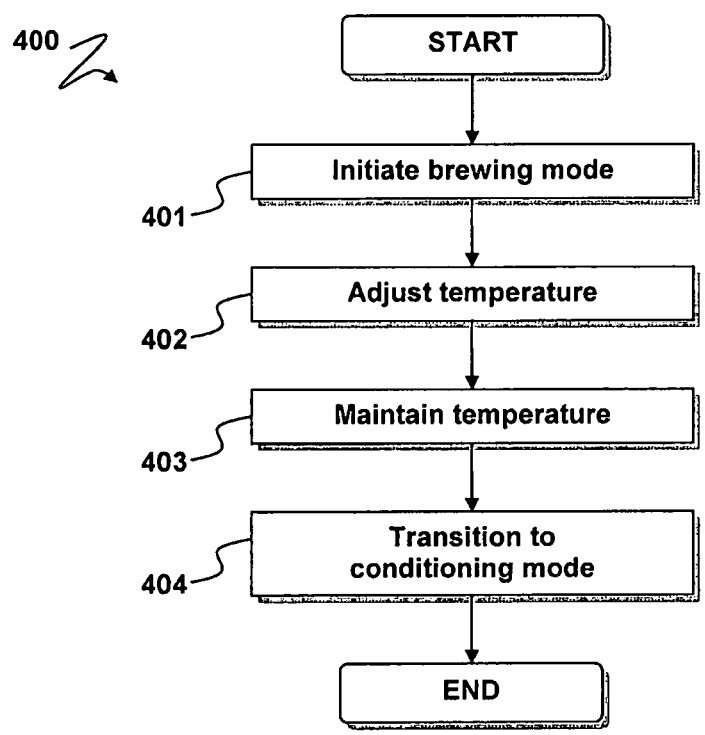
FIG. 4 is a flow chart illustrating a first exemplary method of operating the beverage brewing apparatus.

Referring to FIG. 4, prior to initiation of method 400, the bag 203 may be secured to the lid 202 and placed within the pressure vessel 201. Where required, water may be added to the main compartment 220, along with a fermentation agent. The fitment 230 and tubing are also connected as required.

In step 401, the controller 19 receives an initiation signal from the user interface 23 indicating that the user wishes to begin a brewing process. This initiation signal may include an indication of the beverage currently being brewed in order to enable determination or access of the appropriate control settings.

In step 402, the controller 19 controls the Peltier element 14 to adjust the temperature within the sealed interior of the pressure vessel, for example to substantially 20° C. or such other temperature specified as appropriate for the brewing mode.

In step 403, the temperature is maintained for substantially 120 hours (depending on the product style). During this time, pressure is built up within the bag 203 due to conversion of fermentable sugars in the wort to alcohol and $CO_2$. The system is sealed and therefore retains some of the $CO_2$ in the bag 203. The pressure relief valve 21 manages the bag 203 pressure by allowing excess $CO_2$ to be released—for example maintaining substantially 20 to substantially 25 PSI pressure in the bag—to encourage reabsorption of the $CO_2$ into the fermenting wort to naturally carbonate the beverage.

In step 404, on completion of the substantially 120 hours the controller 19 determines that the brewing process has completed, and transitions to a conditioning mode—which will be described with reference to FIG. 5. An indication of the apparatus 10 being in a conditioning mode may be displayed on the user interface 22.

Figure 5:
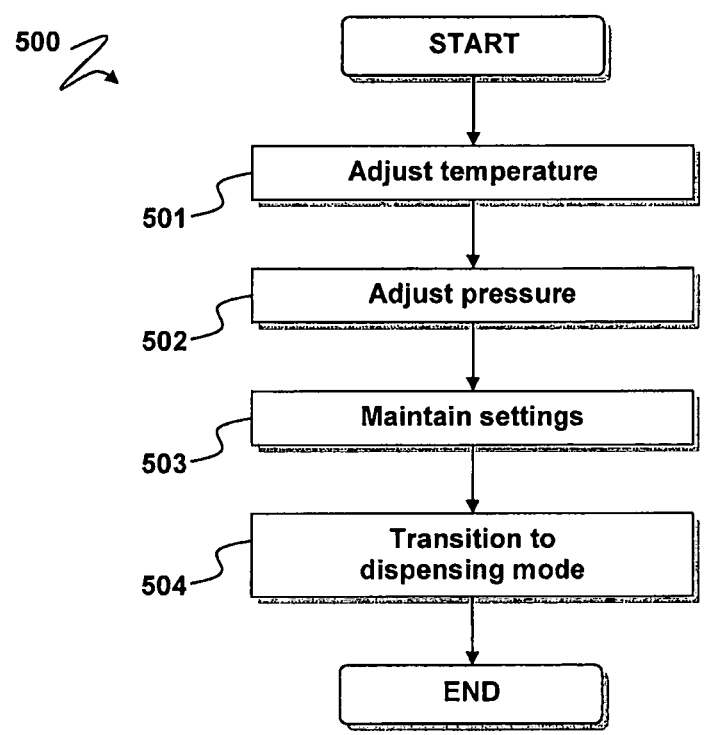
FIG. 5 is a flow chart illustrating a second exemplary method of operating the beverage brewing apparatus.

Method 500 of FIG. 5 is a conditioning process for fermented beverages, such as beer, having undergone the brewing process of method 400.

Prior to initiation of, during, or after method 500 clarification agents may be added to the main compartment 220 of the bag 203.

In step 501, the controller 19 controls the Peltier element 14 to adjust the temperature within the sealed interior of the pressure vessel to a conditioning temperature—for example substantially 2° C.

In step 502, the controller 19 controls the pressure source 20 to adjust the pressure within the sealed interior of the pressure vessel, for example to substantially 10 to substantially 12 PSI. The controller may initiate such control on determining that temperature has dropped to a predetermined threshold below which carbonation may be impacted on—for example between substantially 4 to substantially 9° C. Further, desired pressure levels may be determined based on temperature sensed within the vessel 11.

In step 503, the controller 19 maintains the temperature and pressure for substantially 70 hours.

In step 504, on completion of the 70 hours the controller 19 determines that the conditioning process has completed, and transitions to a dispensing mode—which will be described with reference to FIG. 6. An indication of the apparatus 10 being in a dispensing mode may be displayed on the user interface 22.

Where the bag 203 contains a beverage provided in a condition for consumption, it may be fitted to the apparatus substantially as described above, and a chilling mode initiated by a user via user interface 23. The controller 19 controls Peltier device 14 to maintain a temperature of substantially 2 to substantially 4° C. for several hours before entering the dispense mode.

Figure 6:
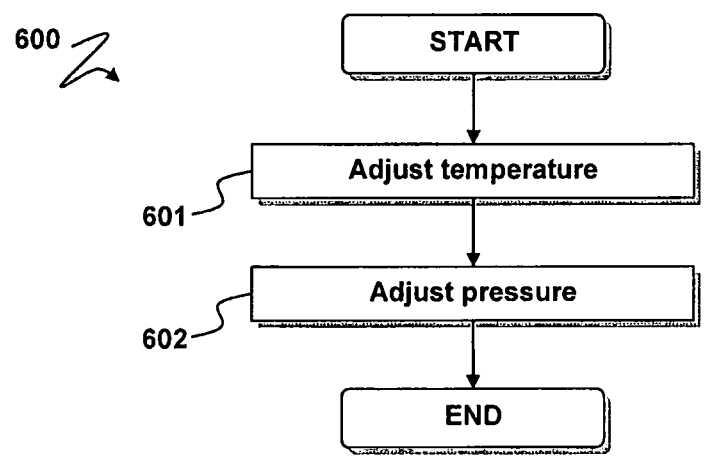
FIG. 6 is a flow chart illustrating a third exemplary method of operating the beverage brewing apparatus.

Method 600 of FIG. 6 is a dispensing process using the apparatus 10.

In step 601, the controller 19 controls the Peltier element 14 to adjust the temperature within the sealed interior of the pressure vessel to the desired dispensing temperature—for example substantially 2 to substantially 4° C.

In step 602, the controller 17 controls the pressure source 20 to maintain pressure within the sealed interior of the pressure vessel 11 to be substantially 10 to substantially 12 PSI. In doing so, when dispensing tap 300 is opened by the user the pressure differential between the sealed interior of the pressure vessel 11 and the interior of the bag 203 compresses the bag 203 to dispense the beverage through the fitment 230 at the top of the bag 203.

This squeezing action may result in sediment remaining settled in the bottom of the bag 203 until the bag 203 to contain it and prevent it from being disturbed and dispensed with the beverage. However, it should be appreciated that filtration means may be provided—for example inline filter 24 of FIG. 1. It is envisaged that such a filter 24 may also assist in reducing foaming of the beverage as it is dispensed.

This filter 24 may also be configured to contain flavouring, providing multi-functionality within a single unit. In addition to reducing space requirements within the apparatus 10, this may reduce the number of components requiring cleaning by the user to maintain hygiene.

Once the tap 300 is closed, the external pressure on the bag 203 is maintained to achieve the internal pressure required to maintain the desired level of carbonation.

The weight of the apparatus 10 may be monitored—for example using load cell 25 of FIG. 1 in communication with the controller 19—and used to determine the quantity of beverage remaining for display to the user. Alternatively, the controller 19 may determine the volume of beverage dispensed (and therefore volume remaining) based on how long the tap 300 is open and a flow rate for the tap 300. The length of time the tap 300 is open may be determined, for example, based on changes in pressure within the vessel 11 and time required for the pressure source 20 to restore pressure.

Once all the beverage has been dispensed, pressure may be released, and the bag 203 may be removed and disposed of—although it should be appreciated that some or all of the components may be reused if so desired.

Aspects of the present invention have been described by way of example only and it should be appreciated that modifications and additions may be made thereto without departing from the scope thereof as defined in the appended claims.

What we claim is:

1. A beverage apparatus, comprising:
   a pressure vessel configured to receive a flexible bag for containing a beverage;
   a pressure release valve configured to be connected to the bag;
   a pressure source connected to the pressure vessel, wherein the pressure source is configured to pressurize the pressure vessel using a gas;
   a temperature adjustment device configured to adjust temperature within the pressure vessel independently of the pressure source; and
   a controller comprising one or more processors and one or more memories storing instructions that are executable by the one or more processors and configured to:
      control the temperature adjustment device to maintain a desired temperature within the pressure vessel according to a current mode of the apparatus, and
      control the pressure source to achieve a desired pressure within the pressure vessel according to the current mode, wherein the current mode is selected from a plurality of modes, wherein the modes comprise a fermenting mode, in which the controller is configured to control the temperature adjustment device to adjust the temperature within the pressure vessel to be within a first temperature range suitable for fermentation of the beverage, for a first predetermined period of time.

2. A beverage apparatus as claimed in claim 1, wherein the modes comprise a conditioning mode, in which the controller is configured to:
control the temperature adjustment device to adjust the temperature within the pressure vessel to be within a second temperature range below the first temperature range, suitable for conditioning of the beverage, for a second predetermined period of time.

3. A beverage apparatus as claimed in claim 2, wherein while in the conditioning mode the controller is configured to:
control the pressure source to achieve a desired conditioning pressure level within the pressure vessel.

4. A beverage apparatus as claimed in claim 3, wherein while in the conditioning mode the controller is configured to:
determine the desired conditioning pressure level based at least in part on the temperature within the pressure vessel.

5. A beverage apparatus as claimed in claim 4, wherein while in the conditioning mode the controller is configured to:
initiate control of the pressure source to achieve the desired conditioning pressure level on determining that the temperature within the pressure vessel has decreased from being within the first temperature range to a predetermined temperature.

6. A beverage apparatus as claimed in claim 4, wherein the desired conditioning pressure level is proportional to the temperature within the pressure vessel.

7. A beverage apparatus as claimed in claim 2, wherein the modes comprise a dispense mode, in which the controller is configured to:
control the temperature adjustment device to adjust the temperature within the pressure vessel to be within a third temperature range suitable for dispensing of the beverage; and
control the pressure source to maintain a dispensing pressure level within the pressure vessel.

8. A beverage system, comprising:
a beverage apparatus, comprising:
a pressure vessel configured to receive a flexible bag for containing a beverage;
a pressure release valve configured to be connected to the bag;
a pressure source connected to the pressure vessel, wherein the pressure source is configured to pressurize the pressure vessel using a gas;
a temperature adjustment device configured to adjust temperature within the pressure vessel independently of the pressure source; and
a controller comprising one or more processors and one or more memories storing instructions that are executable by the one or more processors and configured to:
control the temperature adjustment device to maintain a desired temperature within the pressure vessel according to a current mode of the apparatus, and
control the pressure source to achieve a desired pressure within the pressure vessel according to the current mode,
wherein the current mode is selected from a plurality of modes, wherein the modes comprise a fermenting mode, in which the controller is configured to control the temperature adjustment device to adjust the temperature within the pressure vessel to be within a first temperature range suitable for fermentation of the beverage, for a first predetermined period of time; and
a flexible bag containing a beverage, the bag positioned within the pressure vessel.

9. A beverage system as claimed in claim 8, wherein the pressure vessel comprises a lid configured to be fitted to the pressure chamber,
wherein the bag comprises a spout made of more rigid material than the walls of the bag, configured to be attached to the lid such that at least a portion of the flexible walls of the bag lie against a surface of the lid facing the pressure chamber.

10. A beverage system as claimed in claim 9, wherein the spout comprises a flange configured to bear against the surface of the lid facing the pressure chamber.

11. A beverage system as claimed in claim 8, wherein an internal capacity of the bag is greater than an internal volume of the pressure vessel.

12. A method of brewing a beverage using the beverage system comprising a beverage apparatus, the apparatus comprising a pressure vessel configured to receive a flexible bag for containing a beverage, a pressure release valve configured to be connected to the bag, a pressure source connected to the pressure vessel and configured to pressurize the pressure vessel using a gas, a temperature adjustment device configured to adjust temperature within the pressure vessel independently of the pressure source, and a controller comprising one or more processors and one or more memories storing instructions that are executable by the one or more processors and configured to control the temperature adjustment device and the pressure source, the system further comprising a flexible bag configured to be positioned within the pressure vessel, and the method comprising the steps of:
positioning the bag within the pressure vessel;
connecting the bag to the pressure release valve;
mixing base ingredients and fermentation agent within the bag; and
controlling the temperature within the pressure vessel according to a current mode of the apparatus.

13. A method as claimed in claim 12, comprising:
controlling, using the controller, the temperature adjustment device to adjust the temperature within the pressure vessel to be within a first temperature range suitable for fermentation of the beverage, for a first predetermined period of time.

14. A method as claimed in claim 13, comprising:
on completion of the first period of time, controlling, the temperature adjustment device to adjust the temperature within the pressure vessel to be within a second temperature range below the first temperature range, suitable for conditioning of the beverage, for a second predetermined period of time.

15. A method as claimed in claim 14, comprising:
controlling the pressure source to achieve a desired conditioning pressure level within the pressure vessel.

16. A method as claimed in claim 15, comprising:
determining the desired conditioning pressure level based at least in part on the temperature within the pressure vessel.

17. A method as claimed in claim 15, wherein controlling the pressure source to achieve a desired conditioning pressure level comprises initiating control on determining that the temperature within the pressure vessel has decreased from being within the first temperature range to a predetermined temperature.

18. A method as claimed in claim 16, wherein the desired conditioning pressure level is proportional to the temperature within the pressure vessel.

19. A method as claimed in claim 14, comprising:
controlling the temperature adjustment device to adjust the temperature within the pressure vessel to be within a third temperature range suitable for dispensing of the beverage; and
controlling the pressure source to maintain a dispensing pressure level within the pressure vessel.

* * * * *